(12) United States Patent
Ceri et al.

(10) Patent No.: US 8,825,701 B2
(45) Date of Patent: Sep. 2, 2014

(54) METHOD AND SYSTEM OF MANAGEMENT OF QUERIES FOR CROWD SEARCHING

(75) Inventors: Stefano Ceri, Milan (IT); Marco Brambilla, Milan (IT); Alessandro Bozzon, Milan (IT)

(73) Assignee: Politecnico di Milano, Milan (IT)

( * ) Notice: Subject to any disclaimer, the term of this patent is extended or adjusted under 35 U.S.C. 154(b) by 0 days.

(21) Appl. No.: 13/549,827

(22) Filed: Jul. 16, 2012

(65) Prior Publication Data

US 2014/0019435 A1    Jan. 16, 2014

(51) Int. Cl.
*G06F 17/30* (2006.01)

(52) U.S. Cl.
CPC .................. *G06F 17/30864* (2013.01)
USPC .......................................................... 707/779

(58) Field of Classification Search
CPC ..................... G06F 17/30867; G06F 17/30864
USPC .......................................................... 707/712
See application file for complete search history.

(56) References Cited

U.S. PATENT DOCUMENTS

2009/0276419 A1* 11/2009 Jones et al. ..................... 707/5
2012/0158720 A1* 6/2012 Luan et al. ................... 707/732

* cited by examiner

*Primary Examiner* — Sherief Badawi
*Assistant Examiner* — Courtney Harmon
(74) *Attorney, Agent, or Firm* — Nixon & Vanderhye, P.C.

(57) ABSTRACT

A computer-implemented method of management of queries for crowd searching is presented. In the method, an input model including input data e structured queries using query operators is mapped into an output model, which is obtained by modifying the input data and by adding the answers to the structured queries. Input data comprise at least one search object, which may be imported from a search system, at least one structured query operator corresponding to social interactions and a human-generated question related to the at least one search object. Mapping of the input model is according to a query task execution plan that defines a query task to be solved by a crowd, wherein mapping comprises selecting at least one social search engine running on a respective social platform and selecting one or more groups of responders interacting with the at least one social search engines and targeted to respond to the query task.

22 Claims, 11 Drawing Sheets

METHOD AND SYSTEM OF MANAGEMENT OF QUERIES FOR CROWD SEARCHING

FIELD OF THE INVENTION

The present invention relates to a method and system of management of queries for crowd searching, more particularly to a method and system for structured crowd searching interacting in real-time with a social platform.

RELATED ART

Web users are increasingly relying on social interaction to complete and validate the results of their search activities. While search systems are superior machines to get worldwide information, the opinions collected within friends and expert/local communities can ultimately determine users' decisions.

Crowdsourcing service is a distributed query technology for obtaining content by soliciting contributions, usually on-line contributions, from a network of people, referred to as the crowd.

U.S. Pat. No. 8,055,673 discloses a community search query sharing technology operable to provide users with the means to share their information search queries and query results with other users in a community.

Parameswaran, A. and Polyzotis, N. in "*Answering Queries using Databases, Humans and Algorithms*" in the proceedings of the Conference on Innovative Data Systems Research 2011 (Asilomar, CA, 2011), pages 160-166, describes a declarative approach that views the crowdsourcing service as another database where facts are computed by human processors.

Amazon's Mechanical Turk ("MTurk") service allows users to post short tasks ("HITs") that other users ("turkers") can receive a small amount of money to complete.

Kulkarni A. et al. in "*Turkomatic: Automatic Recursive Task and Workflow Design for Mechanical Turk*", published in the Proceedings of Extended Abstracts on Human Factors in Computing Systems—CHI 2011 (Vancouver, CA, 2011), pages 2053-2058, describes an interface that accepts task requests written in the natural language. For each request it posts a HIT to Mechanical Turk asking workers to break the task down into a set of logical subtasks. These subtasks are automatically reposted to Mechanical Turk, where workers can choose to break tasks further down or to solve them. Once all subtasks are completed, HITs are posted asking workers to combine subtask solutions into a coherent whole that is returned to the requester.

Franklin M. J. et al. in "*CrowdDB: answering queries with crowdsourcing*", published in Proceedings of the 2011 International Conference on Management of data (SIGMOD '11, ACM, New York, N.Y., USA), pages 61-72, described a system, called CrowdDB, which extends a traditional query engine with a small number of operators that solicit human input by generating and submitting work requests to a micro-task crowdsourcing platform. User interfaces were automatically generated by CrowdDB for crowdsourcing incomplete information (e.g. professors' department data) and subjective comparison (i.e. ranking pictures with regard how well these pictures depict the Golden Gate Bridge).

Marcus, A. et al. in "*Crowdsourced Databases: Query Processing with People*", published in the proceedings of the 2011 Conference on Innovative Data Systems Research (Asilomar, CA, 2011), pages 211-214, proposed a crowdworker-aware database system (called Qurk) and describes a prototype running on MTurk. A HIT that is generated from the task manager first probes a Task Cache and Task Model to determine if the results has been cached or if a learning model has been primed with enough training data from other HITs to provide a sufficient result without calling out a crwodworker. If the HIT cannot be satisfied by the Task model or the Task Cache, then it is passed along to the HIT Compiler, which generates the HTML form that a turker sees when they accept the HIT and the compiled HIT is passed to the MTurk. Upon completion of a HIT, the Task model and the Task Cache are updated with the newly learned data and a Task Manager enqueues the resulting data in the next operator of the query plan.

In "*Human powered Sorts and Joins*", Proceedings of the VLDB Endowment, Vol. 5, 2011, pages 13-24, Marcus A. et al. focus on the implementation of two of the most common database operators, joins and sort, in Qurk.

Crowdsourced contributions have been used also in a complex task such as word processing. In "*Soylent: a word processor with a crowd inside*", published in Proceedings of annual symposium on User Interface Software and Technology (UIST 2010, New York, N.Y., USA, ACM press), pages 313-322, Bernstein M. S. et al. presented a word processing interface that utilises crowd contributions to aid complex writing tasks ranging from error prevention and paragraph shortening to automation of tasks like citation searches and tense changes. The idea behind the paper is to embed paid crowd workers in an interactive user interface to support complex cognition and manipulation tasks on demand.

In US 2011/0282891 techniques are provided to identify certain shared search interests and to provide additional search capabilities based thereon. The disclosed methods and apparatuses identify a "search crowd" which may have varying numbers of "members" with which search crowd information may be provided, collected, and/or otherwise shared. Once a search crowd has been identified, information associated with the search crowd may be established and maintained. Information may be established which may provide for a social network search atmosphere among a plurality of users. For example, according to the patent application, current and future members of a search crowd may be presented with and/or otherwise selectively access and/or interact with search crowd information.

Patent application US 2010/0058202 relates to a method and system for an interactive and social search engine that connects people performing similar searches and enables these people to preview, rate, comment on and chat about external websites and news sources during their search.

A social search engine is disclosed in US 2011/0106895, in which methods include the actions of receiving a question from an asker in which the question is associated with one or more topics; ranking candidate answerers based at least partly on each answerer's respective relationship to the asker and a respective probability that the answerer will provide a satisfactory answer to the question; sending the question successively to groups of one or more candidate answerers according to the ranking until an answer is received from a particular one of the candidate answerers; and sending to the asker the received answer and information that identifies the particular answerer.

SUMMARY OF THE INVENTION

Human curiosity and creativity is often capable of going much beyond the capabilities of search systems in scouting "interesting" results, or suggesting new, unexpected search directions. Personalized interaction often occurs aside of the search systems and processes. When such interaction is completed and users resort to the use of search systems, they do it through new queries, loosely related to the previous search or to the social interaction.

Having regard to crowdsourcing services, the Applicants have noted that if the crowd's role in query systems is mainly to be a "data producer" in a system that seamlessly integrates conventional and crowd sources, the tasks assigned to a crowd could be significantly limited.

The Applicants have understood that it can be advantageous to allow responders to express sentiments as like or dislike in reply to a query while making possible to integrate a query process into a networked community through the mediation of a social search engine of a social platform.

According to an aspect consistent with the present disclosure, a computer-implemented method of management of queries for crowd searching is presented. In some preferred embodiments, the method comprises:

providing an input template to a master user for coding a query for crowd searching, the input template having an input format;

receiving input data in the input template according to the input format, the input data comprising at least one search object, at least one structured query operator corresponding to social interactions and a human-generated question related to the at least one search object;

assembling the input data in the filled-in input template to generate an input model constructing a query task for crowd searching;

processing the input model according to a query task execution plan that defines the query task to be solved by a crowd, wherein processing comprises selecting at least one social search engine running on a respective social platform and selecting one or more groups of responders interacting with the at least one social search engines and targeted to respond to the query task;

instantiating, based on the query task execution plan, a plurality of platform-aware query templates, each query template having a data structure supported by the at least one social search engine;

importing the plurality of platform-aware query templates into the respective social platform through a plurality of respective responder application user interfaces allowing the one or more groups of responders to enter an answer to the query;

collecting the answers through interaction with responders of the one or more groups of responders;

processing the collected answers so as to generate an output model instantiated by an output template, and rendering the output template as a query result to the master user.

Consistently with a further aspect of the present disclosure, a computer-readable medium encoded with computer-executable instructions for performing the above described method is presented.

According to an embodiment, in the method, providing the input template to a master user is through a master application user interface and comprises prompting the master user to select at least one structured operator from a plurality of structured query operators available in the input template through the master application user interface.

Preferably, collecting answers comprises collecting by means of a plurality of platform-aware templates which are produced automatically as result of the query task execution plan.

In an embodiment, the input template comprises a layout of data fields for the incoming input data, and receiving input data comprises:

inserting, by the master user, the human-generated question on a first data field of the input template, selecting, by the master user, at least one structured query operator from a plurality of structured query operators comprised in the input template as entries of at least one second data field, and importing the at least one search object into the input template through a search interface of a search system.

According to an embodiment, rendering the output template comprises exporting the output template to a search interface of a search system, the method further comprising, after rendering the output template, performing at least one of the following actions:

running a search process within the search system, the search process being at least partly based on the collected answers, and repeating providing an input template to the master user and receiving input data, wherein the input data comprise at least part of the collected answers.

In an embodiment, processing the collected answers comprises assembling the collected answers and rendering the output template to the master user comprises rendering the output template through a master application user interface by filling the output template with the collected answers.

Preferably, the at least one search object is a plurality of search objects and the input model is a tuple <C, N, S>, where C is a data collection comprising the plurality of search objects, N is at least one natural language question, and S is at least one structured query operator.

Preferably, the data collection C is one or more tuples described by a relational schema instance.

In an embodiment, the responder user interface is embedded in a embedding environment of the social platform by using a plug-in program logic in conjunction with the at least one social search engine. Preferably, embedding comprises loading each responder application user interface of the plurality of responder application user interfaces on a client node of a responder of the one or more groups of responders.

In another embodiment, the at least one social search engine comprises at least one native widget running on a graphical user interface and the plurality of responder application user interfaces is rendered to the one or more groups of responders by using the at least one native widget of the social platform. Preferably, the at least one social search engine comprises a plurality of application programming interfaces allowing access to the at least one native widget and to a database within the social platform for selecting the one or more groups of responders.

Preferably, importing the plurality of platform-aware query templates comprises rendering each platform-aware query template to a respective responder of the one or more groups of responders through a respective responder application user interface.

Preferably, the at least one structured query operator is one or more operators selected from the group consisting of at least one preference query operator, at least one rank query operator, at least one cluster query operator and at least one modification query operator.

In an embodiment, processing according to a query task execution plan further comprises setting a time threshold for the collection of answers.

In an embodiment, processing according to the query task execution plan further comprises splitting of the query task into a plurality of sub-query tasks and routing of sub-query tasks to sub-groups of responders of the one or more groups of responders.

In an embodiment, providing the input template to a master user is through a master application user interface that is installed on a client node and receiving input data comprises transmitting input data to a server node being connected to the client node via a network.

According to a further aspect consistent with the present disclosure a system for managing human-generated queries is provided, the system comprising:

at least one programmable processor;

a storage medium operatively coupled to the at least one processor, wherein the processor performs:

providing an input template to a master user for coding a query for crowd searching, the input template having an input format;

receiving input data in the input template according to the input format, the input data comprising at least one search object, at least one structured query operator corresponding to social interactions and a human-generated question related to the at least one search object;

assembling the input data in the filled-in input template to generate an input model constructing a query task for crowd searching;

processing the input model according to a query task execution plan that defines the query task to be solved by a crowd, wherein processing comprises selecting at least one social search engine running on a respective social platform and selecting one or more groups of responders interacting with the at least one social search engines and targeted to respond to the query task;

instantiating, based on the query task execution plan, a plurality of platform-aware query templates, each query template having a data structure supported by the at least one social search engine;

importing the plurality of platform-aware query templates into the respective social platform through a plurality of respective responder application user interfaces allowing the one or more groups of responders to enter an answer to the query;

collecting the answers through interaction with responders of the one or more groups of responders;

processing the collected answers so as to generate an output model instantiated by an output template, and rendering the output template as a query result to the master user.

According to some embodiments consistent with the present disclosure, although a user may need several crowd search interactions to complete a query task, the method and system allow that every interaction is simple and focused. Simple crowd search sessions may be spawned by users from within possibly long and complex conventional search sessions, wherein each crowd search session is independent.

The method and system according to the present disclosure may fit well in a context where search is seen as a complex, long lived process that may be long-lasting and may involve users in a number of interactions—such as buying a house or deciding a summer trip, an approach typically classified as exploratory search.

In some embodiments consistent with the present disclosure, the method allows a relatively straightforward form of data sharing between a conventional search engine and a social search engine.

BRIEF DESCRIPTION OF THE DRAWINGS

The accompanying drawings, which are incorporated in and constitute a part of this specification, illustrate some exemplary embodiments and, together with the description, facilitate the reader's understanding of the disclosure. These drawings and the associated description are provided to illustrate various embodiments of the invention, and not to limit the scope of the invention.

DETAILED DESCRIPTION OF CERTAIN EMBODIMENTS

Figure 1:
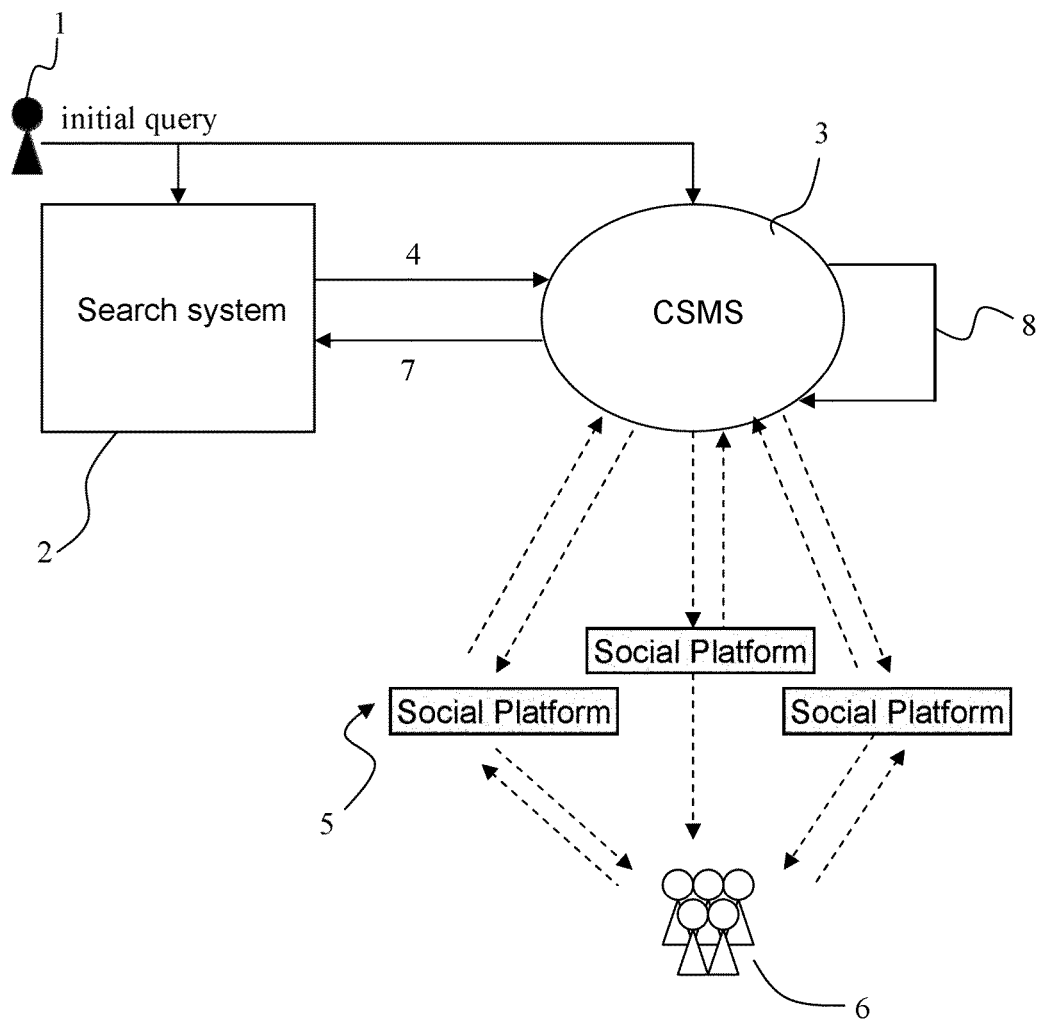
FIG. 1 is a block diagram of a high-level system architecture in connection with one embodiment consistent with the present disclosure.

FIG. 1 is a block diagram of a high-level system architecture overview in connection with one embodiment consistent with the present disclosure. A user 1 submits an initial query, which can be addressed to an Internet search system 2, per se known. The Internet search system can comprise one or more Web data sources. In one embodiment, the initial query is a multi-domain query across search services of the type described in "*Liquid Query: Multi-domain Exploratory Search on the Web*" by A. Bozzon et al., published in the proceedings of the World Wide Web Conference, WWW2010, Apr. 26-30, 2010, Raleigh, N.C., USA.

The user 1 submitting one or more queries is referred in the following also to as master user. If the process starts on a conventional search system 2 (e.g., a vertical search system for real estate, events, travels, businesses), user 1 interacts with a search system which produces as result a list of search objects, typically but not exclusively ordered by relevance. Within the present context, with search object it is meant a result produced by a search system, which typically corresponds to an object or fact of the real world, e.g. a restaurant, a concert, a travel plan, a restaurant, or an hotel. A search object is associated with a data structure referred to as the search object's data schema, which corresponds to a list of properties.

Within the search system 2, the master user can refine the query until resulting search objects correspond to the user's expectations or goals.

Once the search objects have been retrieved by the search system 2, the master user opens a human-interacting search management system 3, referred in the forthcoming description to as Crowd Search Management System (CSMS) and described in more detail in the following, in which user 1 selects one or more of the search objects automatically retrieved by the search system 2. Selection of input search objects may be performed by the user by using ad-hoc web applications or wrappers, known per se.

Feeding of input data into the CSMS is represented in FIG. 1 by arrow 4.

In addition to search objects, the user 1 provides to the CSMS 3 at least one question in natural language. For example, a user can ask questions such as: "I am moving to Stanford for six months, and I found the house rentals below; which one do you recommend? Do you know about other offers?". The human-generated question injected into the CSMS 3 is added to the selected search objects.

In an embodiment, results produced by conventional search engines, such as Google® or Yahoo! ED, are used as search objects. In such case, user 1 builds the input manually by extracting structured information for each selected result item so as to give them a uniform data structure and to insert, in the CSMS, the search objects associated with a specific schema.

In a further embodiment, user 1 starts by addressing an initial query directly to the CSMS 3. In this case, the natural language question and the search objects are directly provided by user 1.

The human-generated question, formulated in natural language, and the collection of search objects are comprised in an input model described in more details in the following.

The input model is mapped according to a query task execution plan to be presented on one or more social platforms 5 and made available to one or more groups of users interacting with the social platforms, who are invited to reply to the query by inserting information data according to a data structure defined by the CSMS.

Herein, with social platform it is meant an on-line community service in which members are enabled to have a representation and to post content. In some embodiments, the social platform is a social networking service provided with a search engine in which members are linkable to other members and can be grouped in social affinity groups. Not limiting examples are: Facebook®, Doodle®, Linked-In®, Twitter®, and MySpace®.

The one or more groups of users asked to insert information data related to the query are herein collectively referred to as the crowd 6 and individually indicated as responders. At the end of the interaction with the crowd 6 results are fed back to user 1. Possible refinements of a search performed by the CSMS system are shown in FIG. 1 by recursive arrow 8. In some embodiments, the CSMS returns results to the search system 2 (arrow 7) and present them in a format that allows their acquisition by the search system 2, thereby enabling a seamless continuation of the search process with subsequent explorations. In other embodiments, the user can suspend the search process and decide how to best operate with the results, in dependence on the feedback received from the crowd.

Figure 2:
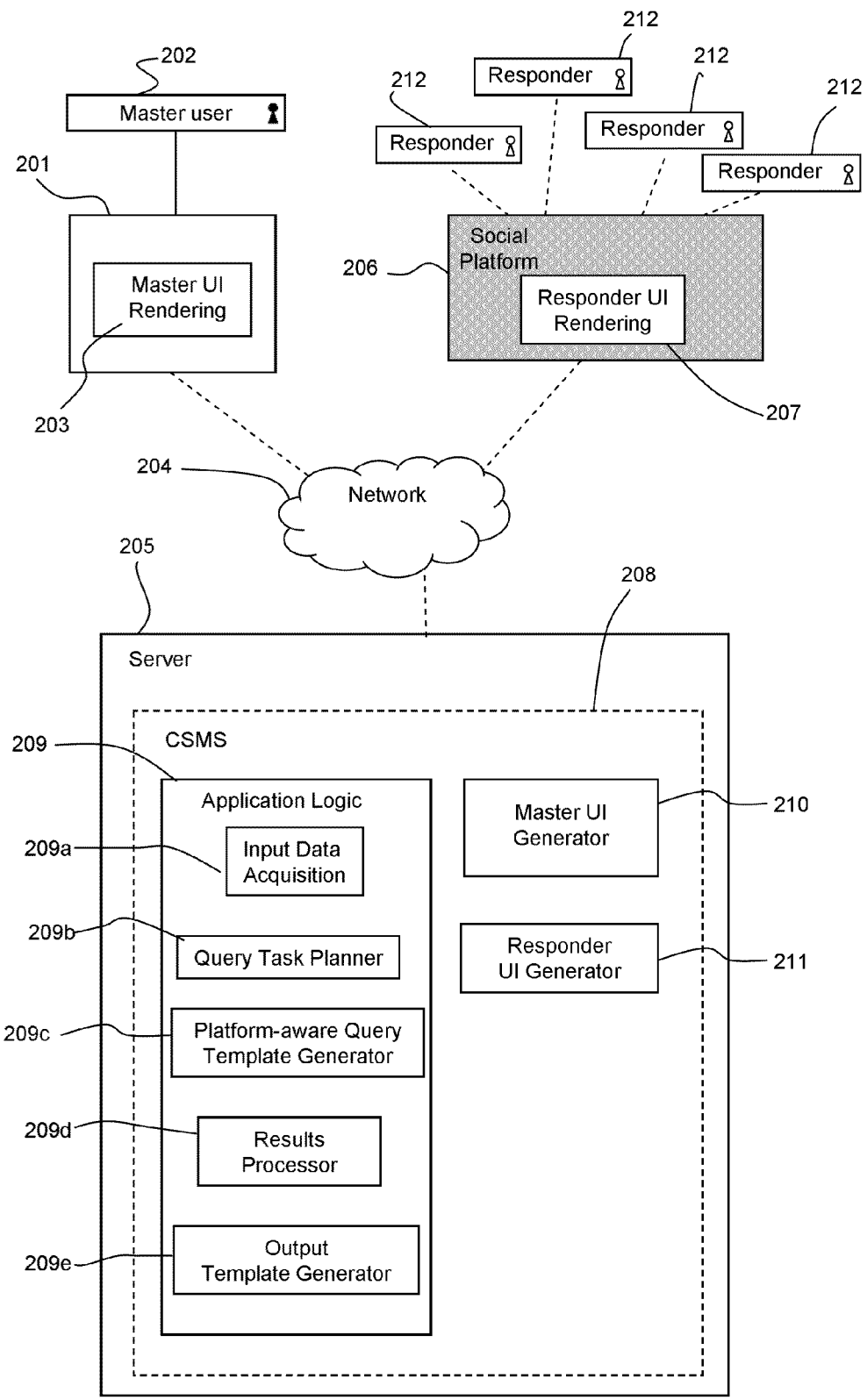
FIG. 2 is a block diagram illustrating a networked computing environment including an exemplary crowd search management system in accordance with one embodiment consistent with the present disclosure.

FIG. 2 is a block diagram of a networked computing environment in which an embodiment consistent with the present disclosure may be implemented. In the embodiment, a client-server communication system is shown incorporating a system for managing human-generated queries in crowd search (CSMS). The networked computing environment comprises a client node 201. The client node 201 can be installed in a user terminal equipment, such as a smart phone, cellular phone, personal computer, workstation, etc. The client node may comprise input applications such as a Web browser user interface or a custom Web application implemented through a visualisation unit (e.g. display) and an input unit (e.g. keyboard, touch screen, etc.) of the user terminal. The client node 201 communicates to a server node 205 via a communication network 204 and receives input data from a master user 202 to be transmitted to the server node 205. Input data are introduced by the master user through a master application user interface (UI) connected to and/or communicating with the input applications of the user terminal. The master application user interface is included in a Master UI Rendering module 203, apt to support the interaction between the master user and a CSMS. Communication network 204 may include one or more wired and/or wireless and/or mobile telecommunication systems or networks, local area networks, the Internet, etc.

Within the networked computing environment a CSMS 208 in accordance to an embodiment of the present invention can be implemented as an application program that can be run on the server or it can be distributed between the client and the server. In the embodiment of FIG. 2, the business logic processing and the application user interface generation of the CSMS resides in the server node, whereas the application interface presentation is hosted outside the server node. In particular, on the server side, the CSMS comprises an Application Logic module 209 for performing the required data entering and data processing comprising query and answer processing.

The Application Logic module 209 includes:
an Input Data Acquisition module 209a apt to receive a human-generated input query from the master user by providing an input template for creating entries and/or making fields available to the master user who inserts and/or selects content in the template. The input template may provide default content for certain fields to be selected. Preferably, the input template contains a layout of data fields for the incoming input data. Once the input template have been filled by the master user and the instances of the (selected) search objects have been received, the Input Data Acquisition module assembles the input data to generate an input model;
a Query Task Planner module 209b apt to create a query task execution plan of the input model by defining the query task to be solved by humans. Within the present description and claims with query task it is meant an activity supporting a crowd search session initiated by an input model. The execution plan comprises selecting one or more social platforms in which to present the query and selecting the crowd interacting with the social platforms and which will be targeted to respond to the query. Further actions can be performed by the Query Task Planner to define the query task, other than platform and crowd selection. For example, the Query Task Planner is apt to set who are the responders to the query (i.e. crowd selection); where to present the query (platform selection); how many times a question within the query should be answered by the crowd (e.g. wait for feedback from 10 responders); a total threshold time for the query termination; how to derive from the input model a plurality of simpler input models to be performed according to a query task execution plan which includes the possibility of executing some of the derived input models in parallel. In some embodiments, the execution plan is created by defining a mapping model to be applied to the input model;

a Platform-aware Query Template Generator module 209c apt to instantiate one or more platform-aware query templates to be published in a social platform 206 selected by the Query Task Planner module. The one or more platform-aware query templates is the instance of the input model mapped to the social platform and represents the query task for humans to solve within the framework of the social platform;

a Results Processor module 209d apt to collect the answers from the crowd to the platform-aware query templates and to process them, and an Output Template Generator module 209e apt to generate an output model to be returned to the master user.

On the server side, the CSMS further includes:

a Master UI Generator module 210 apt to generate an application UI to interact with the client 201 through the Master User Interface Rendering module 203 for the data input and the rendering of input query template and the output query template, and a Responder User Interface Generator module 211 apt to generate an application UI for the presentation of the platform-aware query template to the selected crowd and the collection of the answers from the crowd.

The application UI through which the Responder UI Generator module 211 presents a platform-aware query template to each responder of the selected crowd and collects the feedback from the crowd is published in the social platform and is indicated in FIG. 2 as the Responder UI Rendering module 207.

The selected crowd, i.e. responders 212, is connected to the network 204 and communicates through the social platform 206.

The term "module" as used herein refers to any hardware, software, firmware, artificial intelligence, fuzzy logic, or combination of hardware and software that is capable of performing the functionality associated with that element. More generally, each element of the CSMS and of the networked environment implementing the CSMS may be realized by any suitable combination of hardware, software, firmware. In the figures, various elements are depicted as separate units or modules. However, all or several of the various elements described with reference to this and the forthcoming figures may be integrated into combined units or modules within common hardware, firmware, software and/or combinations thereof. Accordingly, the representation of features as system units or modules is intended to highlight particular functional features for ease of illustration, and does not necessarily require realization of such features by separate hardware, firmware, or software components. In some cases, various elements may be implemented as in one or more computer programs that are executable and/or interpretable on a programmable system including at least one programmable processor, coupled to receive data and instructions from, and to transmit data and instructions to, a storage system, at least one input device, and at least one output device. These computer programs (comprising for example software applications and/or code) include machine instructions for a programmable processor, and can be implemented in a high-level procedural and/or object-oriented programming language, and/or in assembly/machine language. As used herein, the term "computer-readable medium" refers to any computer program product, apparatus and/or device magnetic discs, optical disks, memory).

Figure 3:
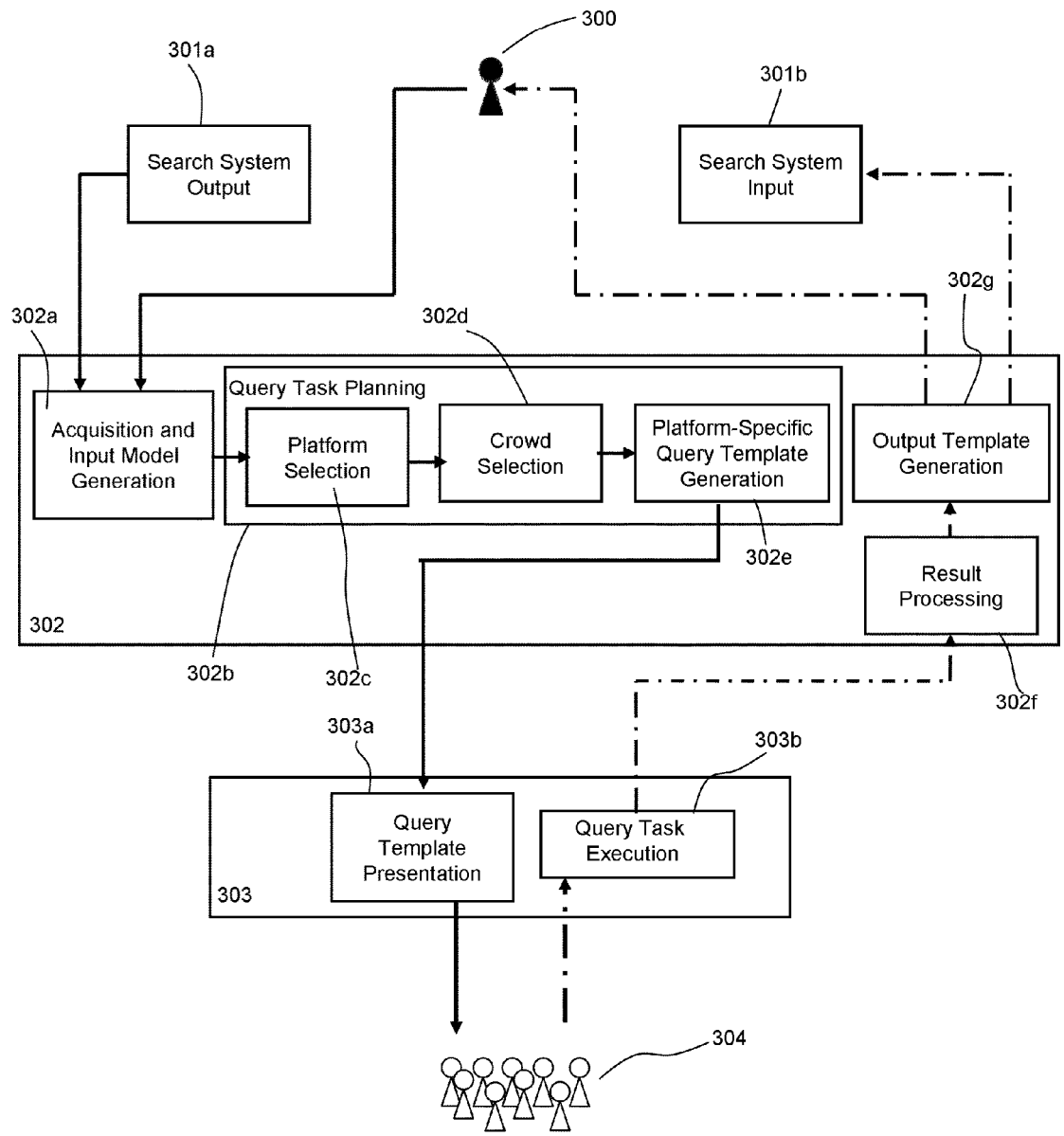
FIG. 3 is a block diagram illustrating a process of crowd search interaction in accordance with one embodiment consistent with the present disclosure.

FIG. 3 is a block diagram illustrating a process of crowd search interaction in accordance with one embodiment consistent with the present disclosure. The process starts from a master user 300 who decides to submit a query to a crowd in relation to a collection of search objects, either resulting as output from a search system or directly provided, and to interact with a search management system (CSMS). In FIG. 3, arrows with a solid line represent the process flow directed from the master user to the crowd, whereas arrows with a dot-dashed line represent the process flow from the crowd back to the master user.

The CSMS, in a search management session (302), has generated an input query template that provides a generic model for coding the input search objects and questions to be inserted and/or selected by the master user. The input query template further contains at least one structured query operator that corresponds to social interactions, such as yes/no, like/dislike, tag, or comment, which can be selected by the master user in dependence of the query to be asked. The input query template is generated in a form independent from the social platform where the query task will be processed. Once the input query template has been generated and rendered to the master user, input data are acquired by the CSMS in a form defined by the input query template (302a). Search objects can be retrieved and automatically inserted by the search system (represented with arrow going from 301a to 302a) or input manually by the master user (represented with arrow going from 300 to 302a). A textual question is entered by the master user into the input query template (arrow going from 300 to 302a).

Once the input query template containing the input data is loaded into the CSMS, an input model is generated by the CSMS (302a).

In some preferred embodiments, the input model is a tuple $Q^I$ including C and N, where C is a data collection comprising one or more search objects and N is a textual query expressed in natural language. Preferably, the input model $Q^I$ comprises a triple <C, N, S>, where S is a collection of structured query operators containing at least one structured query operator. In a preferred embodiment, $Q^I$ is a triple <C, N, S>.

The data collection C is proposed to the crowd for crowd searching. In a relational model and according to some embodiments, C is a plurality of tuples having cardinality card(C) and described by means of a schema sch(C), which for example contains name, type, and constraints (e.g. NOT NULL) of C's attributes. Each tuple has an identifier TID. C can be sorted, in which case an attribute POS indicates the position of each tuple in the input sorting.

The natural language question N, which is presented to the crowd, can be mechanically generated, e.g. in relationship with other specific human-generated queries, or instead be written by the master user.

S comprises one or more structured query operators that are asked to the crowd, relative to the collection C. Structured query operators have a given input form or fixed structure and allow to express preferences about the elements of C, to rank them, cluster them, and change their content. Structured query operators correspond to typical social interactions (e.g. like, dislike, comment, tag). In some embodiments, structured query operators abstract simple and classical primitives of relational query languages which are common in human computation and social computation activities. In practice and according to some embodiments, a query operator defines what action a user should perform in reply to the question and thus in relation to the search objects, for example in relation to each search object contained in the input model.

As non limiting examples, the structured query operators comprise at least one of preference query operators, rank queries, cluster queries and modification queries.

Preference query operators may include:
Like query, counting the number of individuals who like specific tuples of C.
Dislike query, counting the number of individuals who dislike specific tuples of C.
Recommend query, asking users to provide recommendations about specific tuples of C.
Tag query, asking users to provide either global tags or tags about specific attributes of C.

Preference query operators typically operate to modify the schema of C while the search objects remain unchanged.

Rank query operators may include:
Score query, asking users to assign a score (in the 1 . . . n interval) to tuples of C.
Order query, asking users to order the (top n) tuples in C.

Cluster query operators may include:
Group query, asking users to cluster the tuples in C into (at most n) distinct groups.
OrderGroup query, asking users to cluster the tuples in C into (at most n) distinct groups and then order the (top M) tuples in each group.
MergeGroup query, asking users to merge n sorted groups producing a single ordering.
TopGroup query, asking users to cluster the tuples in C into (at most n) distinct groups and then select the top element of each group.

Rank and cluster query operators do not modify the schema of C, at most they modify their order, e.g. because they are ranked or grouped by effect of crowd interaction. The search objects (C) are typically not modified by preference, rank, and cluster operators.

Modification query operators, which operate to modify the search objects (schema may remained unchanged) may include:
Insert query, asking users to add tuples to C.
Delete query, asking users to delete tuples from C.
Correct queries, asking users to identify and possibly correct errors in the tuples of C.
Connect query, asking users to match pairs of similar tuples.

Subsequent to the insertion of the input data in the input query template and thus to the generation of the input model, the CSMS processes the input model according to a query task execution plan that defines the query task to be solved by humans (302b). The query task execution plan comprises selecting a social platform into which to import the query (302c) and with this selection a social search engine to be used to collect results from the crowd is selected. The selection of the social platform can be performed for example by requesting the master user to indicate one or more social platforms in which to query the crowd. In one embodiment, the system can select the social platform autonomously based upon knowledge about the query, the master user, and the social platforms.

Within the selected social platform, the query task execution plan comprises selecting one or more groups of responders that will be targeted by the query and that define the crowd (302d). The selection of the users for answering the query is made by the system following an input from the master user (e.g. manual selection of the group of friends she/he thinks they can be of help) and/or by retrieving one or more groups of responders according to some defined criteria (e.g. users from the "friends list" within the social networking service or members of a business-related social networking service who have a specific job profile). In some embodiments, the query task execution plan further comprises defining a time threshold for the collection of the results is set to constrain the termination of the query.

Once the execution plan is defined, the CSMS generates a mapping model which specifies how the selected search engines can be involved in producing an output model of a given query.

In some preferred embodiments, the mapping model M is a tuple <E, G, H, T, D> where:
E is the social search engine or engines of the selected social platform(s) to be used in the query.
G is the crowd that should interact with the one or more search engines. This could be: the master user's friends, specific subsets of the user's friends, geo-localized people, expert people, workers selected on a work platform, and so on. G(E) denotes the subset of users in G that are accessible through a given crowd engine E.
H represents constraints in the execution of a query; in particular, it indicates which conditions should hold for a query to be terminated. For instance, collecting at least K answers from H different users, or lasting for three minutes.
T is a transformation process, which applies to a query and transforms it into a plurality of smaller sub-queries such that answering the sub-queries and then combining their results allows answering the original query. A transformation is needed when the query is too complex to be directly proposed to a social search engine. The component T of the tuple is optional.
D is the set of platform-aware templates used to present C and express structured query operators for a given query. Templates for displaying C have a style, e.g. textual, tabular, geo-referenced on a map, time-referenced on a time line, represented as the points of a Cartesian space, and so on.

More generally, M is a tuple comprising E, G and D. In embodiment, M is a tuple <E, G, D>.

The mapping model produces a platform-aware query template that is structured in a form to be publishable in the selected social platform (302e) and that allows responders to interact with the content of the platform-specific query template.

The CSMS transmits the platform-aware query template to the social platform that imports it through an application user interface (UI) to be presented to the crowd 304, as explained more in detail in the following. The imported template is submitted to the crowd to which the query template is presented (303a) to start a session of crowd interaction (303).

Execution of the mapping model from the crowd may be conducted according to several execution strategies which are defined in the query task execution plan. For example, execution strategies may include routing and splitting of query tasks. Query task splitting occurs when the collection is too complex relative to the cognitive capabilities of users or to the limitations imposed by the social platform. Splitting strategies may depend on the specific social platform being used. Query task routing occurs when a query task can be distributed according to the values of some attribute of the collection; for instance, if the structured query is an "Insert" for more restaurants, the attribute City can be used to route the queries to specific users living in that same City. Task routing requires accessing profiles while selecting crowds. Presence indicators could be used for routing queries to users of a given physical location. Based on these choices entered the input model, the query is possibly split and routed to groups of users.

Based on the setting of the query task execution plan defined in the mapping model, the responders of the crowd 304 are engaged by inviting them to respond to the query, namely by requesting them to execute the query task defined by the mapping model (303b).

At a selected time (e.g. constraint on query termination defined by a time threshold or a number of received answers), results of the query task execution are collected and processed by the CSMS (302f). Result processing can for example include selecting a subset of answers and/or objects based on some predefined criteria, aggregating equal or like results or reordering results according to the preferences expressed by the crowd. Processed results create an output model that is then presented to the master user 300 after instantiation of at least one output query template (302g) for displaying or otherwise presenting search results from the responders. In some embodiments, especially when the mapping model is set to collect standardised answers in a specific format, e.g. by using structured preference queries, the results are summarised in a single output query template to be rendered to the master user.

In some preferred embodiments, the output model $Q^O$ is a tuple <C',S'> where C' is a collection of search objects comprising at least one search object and S' is a collection of structured answers to the query operators S. In an embodiment $Q^O$ is a single element tuple <C'>.

The output model is produced by CSMS and delivered asynchronously, as C' is the data collection which is returned to a user after the query task defined in the mapping model has been executed. The cardinality of C' of the output model can be equal to card(C), be larger (e.g. as a result of an Insert query) or smaller (e.g. as a result of a Delete Query).

In one embodiment, the schema Sch(C') is obtained by adding to Sch(C) attributes which are used as slots for the answers to the structured query operators S in S'. Preferably, the attributes comprise:

A counter L of people who like each tuple of the input model.
A counter D of people who disliked each tuple of the input model.
A score value S representing the average score given by people to each tuple of the input model.
A list R of character strings of people who added N recommendations to tuples of the input model.
A list T of terms (simple or compound words) of people who tagged each tuple of the input model.
A tuple identifier POS if the users ordered the tuples of the input model.
A group identifier GID if the users clustered the tuples of the input model into groups.
A group position GPOS if the users ordered the clusters (GPOS is repeated for each tuple in the cluster).

The CSMS collects the results of query task execution and processes them by aggregating responses of individual users so as to generate the output model. The output model produces a platform-independent output template, which is either directly presented to the user, or adapted to the data format accepted by the search system—thus possibly submitted as a new input to the search system (301b).

In an embodiment, actions of the process shown in FIG. 3 are carried out by the CSMS described with reference to FIG. 2. In particular, an input model is defined by entering input data in Master UI Rendering module 203 generated by Master UI Generator module 210; input model acquisition (302a) is performed by Input Data Acquisition module 209a; platform selection and crowd selection (303c, 303d) are performed by Query Task planner 209b; platform-aware query template generation (302e) is carried out by Platform-aware Query Template Generator module 209c; input query template is presented through an application UI comprised in Responder UI Rendering module 207 generated by Responder UI Generator module 211; result processing (302f) is performed by Results Processor module 209d and instantiation of the output query template (303f) is performed by Output Template Generator module 209e.

The mapping model can be deployed in many ways, due to the variety of the social platforms for interacting with the human responders and of the diversity of the interfaces that they expose for interaction from outside.

Figure 4A:
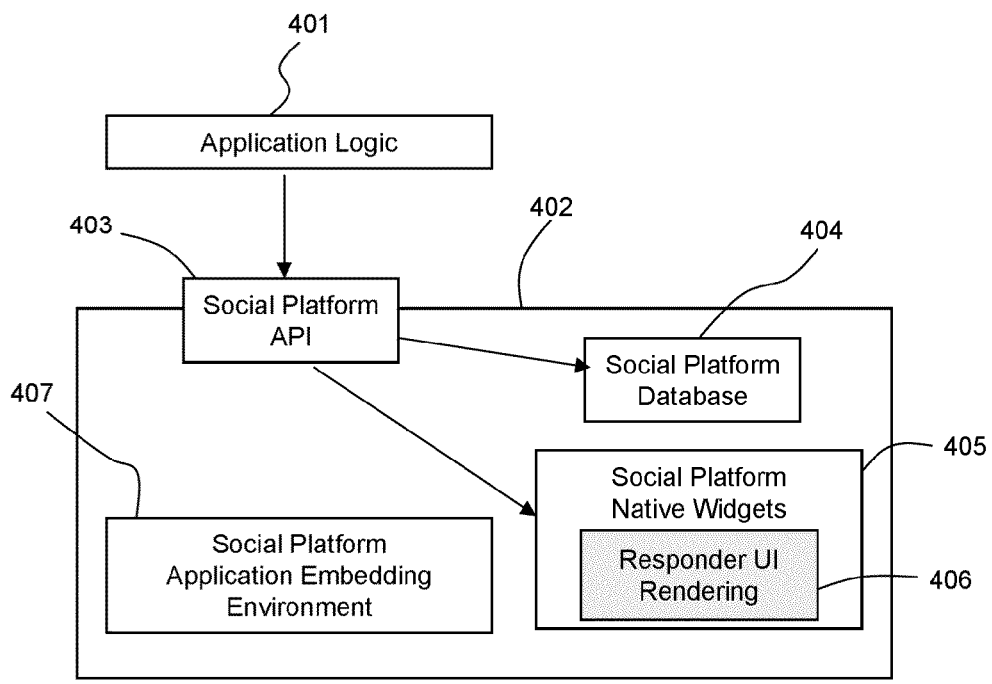
FIG. 4a is a block diagram of the architecture for importing a responder application user interface (UI) created by the CSMS into a social platform, according to one embodiment consistent with the present disclosure.

FIG. 4a is a block diagram of the architecture for importing an application UI created by the CSMS into a social platform, according to one embodiment consistent with the present disclosure. In this embodiment the mapping model is deployed through a responder application interface using native widgets supported in the social platform. In particular, the CSMS through its Application Logic module 401 creates a mapping model imported into a social platform 402 as a responder application UI that interacts with the responders within the social platform. The social platform is provided with an Application Programming Interface (API) module 403, generally comprising a plurality of APIs that allow the CSMS to build an application UI presented to the user as part of social platform environment. Preferably, the APIs of the social platform allow the CSMS to access a database 404 from which to extract or select the responders (e.g. list of friends, group of social network users having a given job profile or living in a given geographical area, etc.). The APIs allow also access to native widgets comprised in a native widget module 405, i.e. software components resident in the social platform which run on a graphical user interface of the social search engine for arranging information that supports interaction with users. Widgets are typically readily executable. The social platform may include an application embedding environment module 407.

In the embodiment of FIG. 4a, the responder application UI of the CSMS directly uses the native widgets of the social platform so that rendering of the application UI is enabled by the widgets. This is represented in FIG. 4a by a Responder UI Rendering module 406. Within this design, the application UI behaves as an external application directly using the native features of the social platform for creating queries and collecting results. An advantage of using the native widgets of the social platform can be the high transparency of the responder application UI within the platform.

Figure 4B:
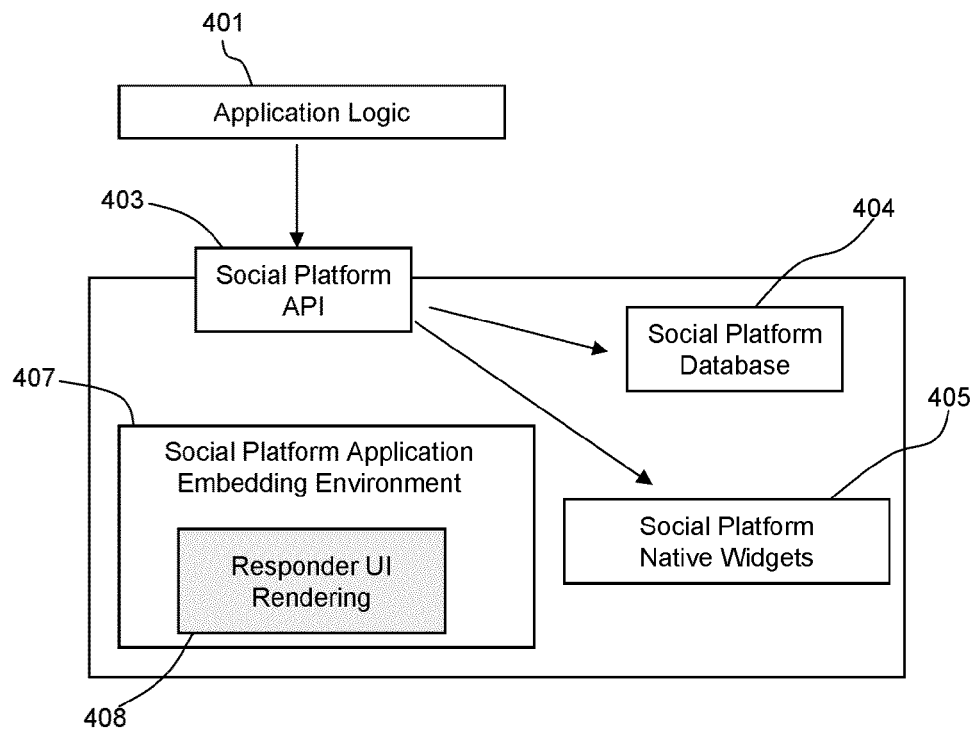
FIG. 4b is a block diagram of the architecture for importing a responder application user interface created by the CSMS into a social platform, according to a further embodiment consistent with the present disclosure.

FIG. 4b is a block diagram of the architecture for importing an application UI created by the CSMS into a social platform, according to a further embodiment consistent with the present disclosure. Like reference numerals to those of FIG. 4a denote like elements having same or similar functionalities. In this embodiment, the mapping model is deployed through an application interface embedded in the embedding environment of the social platform. In the architectural design of FIG. 4b the responder application UI is embedded in the application embedding environment module 407 of the social platform, by using a plug-in mechanism offered by the platform (i.e. through plug-in applications resident in the platform). Responder UI Rendering module 406 on the client side of the responders directly interacts with the CSMS on the server and users of the platform are required to install and load the embedded responder application UI.

An advantage associated with some embodiments consistent with the present disclosure is the independence of queries formulated by the master user from the social search engines and thus from the social platform into which they are imported and executed.

EXAMPLES

Figure 5:
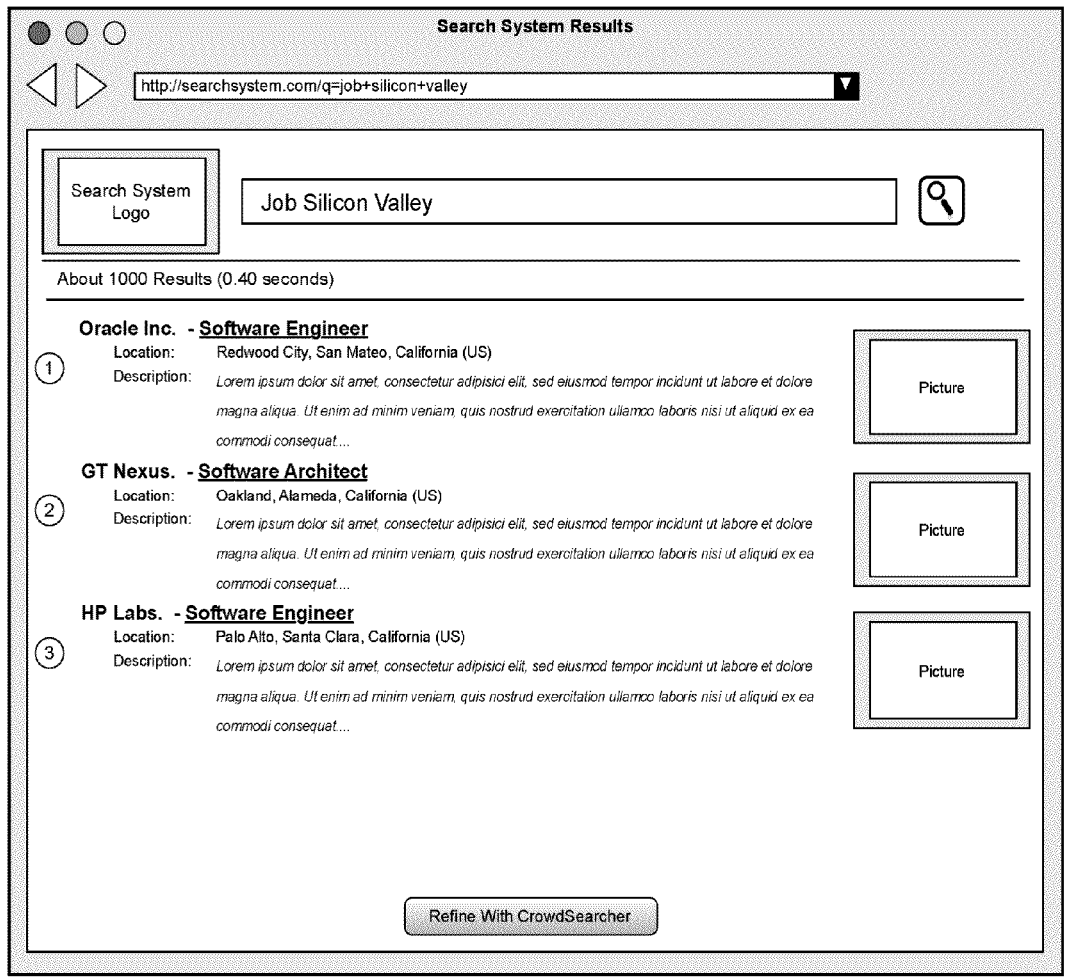
FIG. 5 is a sample screen display showing the results of an exemplary search query directed to a search system.

FIG. 5 is a sample screen display for the rendering of the results produced by a search system, e.g. following a search query launched by the master user in the search system. In the example, the search query was asking for "jobs in Silicon Valley" produces three search objects, relative to jobs at Oracle®, GTNexus®, and HPLabs®, which are ranked by job affinity with the user's profile. At this point, the user decides that she likes to get advices from a community of friends who are in the job market about the selected job and that she requires the interaction with a social platform, e.g. LinkedIn® or Facebook®, for the advice. A button "Refine with CrowdSearcher" is used to provide a master user with the option of invoking the CSMS. The master user then opens the CSMS and defines the query for crowd search through a master application UI. In the present example, the master application UI is integrated with a search exploratory interface providing the exploratory interaction results (i.e. search objects) from an exploratory search session, to be then imported within the query formulation.

Figure 6:
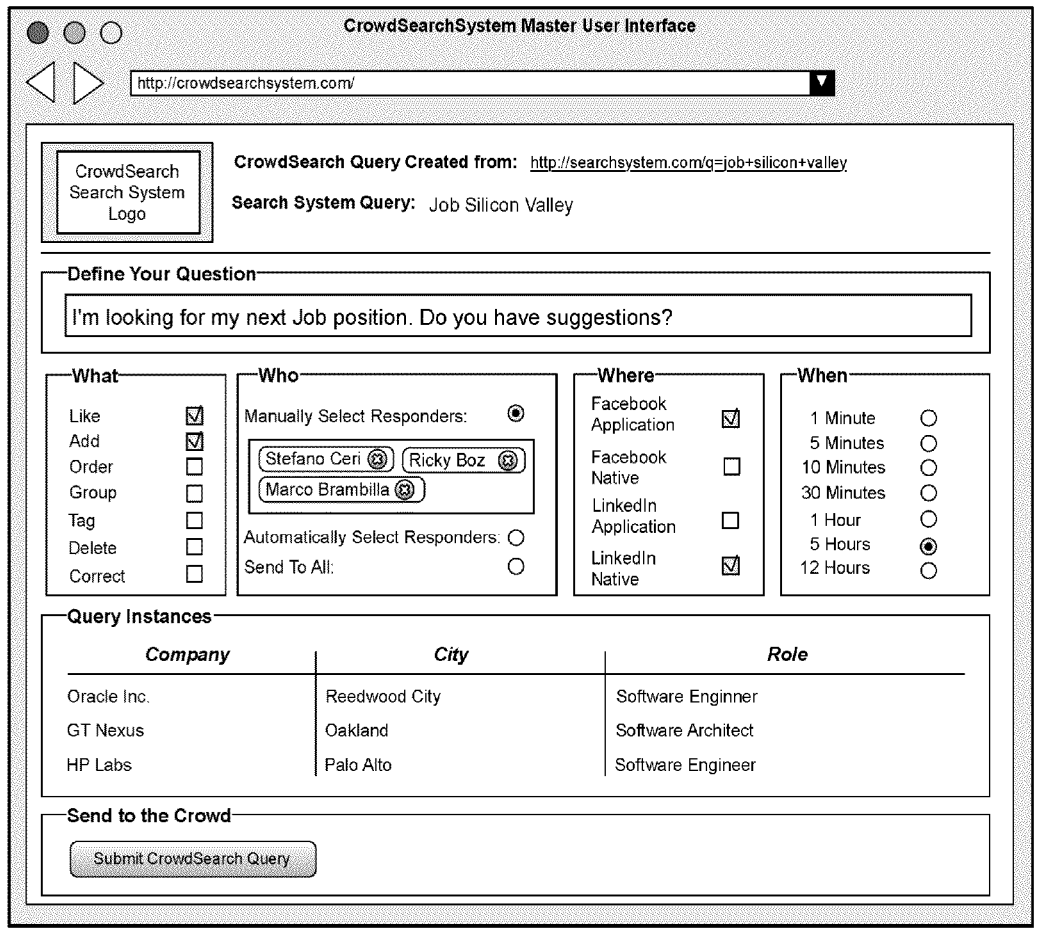
FIG. 6 is a sample screen display of a master user interface presented on the client side of the master user showing the rendering of an input query template to be directed to social platforms.

FIG. 6 is a sample screen display for the rendering of an exemplary master application UI presented on the client side of the master user showing an input query template for entering input data for the generation of the input model (e.g. 302a in FIG. 3). In the input query template created by the CSMS the user can see the list of search objects she selected in the exploratory interface, in the present example the three search objects resulting from the search of FIG. 5 (named "Query Instances"). In an another embodiment, the master user manually enters the search objects in the screen display. The screen display of FIG. 6 includes a panel where the user can enter the textual question, i.e. "I'm looking for my next job position. Do you have suggestions?".

In the master application UI the master user can then enter choices about various options given in the application UI. Namely:
  What: the type of structured query operators (e.g. insert, like, order, score);
  Who: the crowd to invite (e.g. random responders from a friend list or all users affiliated with the master user in the social platform be enumerated);
  Where: the social platform of choice. In the current example, options are exclusive. Each query can be routed to LinkedIn® or Facebook®, and the application UI can either be native (e.g. by selecting "Facebook Native" or "LinkedIn Native" and thus by selecting a system architecture as that of FIG. 4a) or be ad hoc and embedded in the social platform (i.e. by selecting "Facebook Application" or "LinkedIn Application" and thus by selecting a system architecture as that of FIG. 4b). However, the input template can be constructed so that options are not mutually exclusive, for example the query can be imported in more than one social platform.
  When: the duration of the crowd search session (e.g. predefined time frames from 1 minute to 12 hours). According to the options, the query can be routed to random or to selected friends and it can be more or less "urgent", where urgency is defined by the time set by the master user for the query to be terminated. At the selected time, the CSMS collects the received results to be processed and presented through an output query template representing an output model.

In this example, the textual question, the search objects and the input to the panel "What" define the input data inserted in an input template rendered through the master application UI, whereas the selection in the panels "Who" "Where" and "When" define the mapping model to be applied to the input model generated by assembling the input data. Based on the query setting, the crowd receive an invitation to contribute their opinions. The way responders can reply depends on the social platform the user has chosen for collecting answers and more generally to the mapping model.

Figure 7:
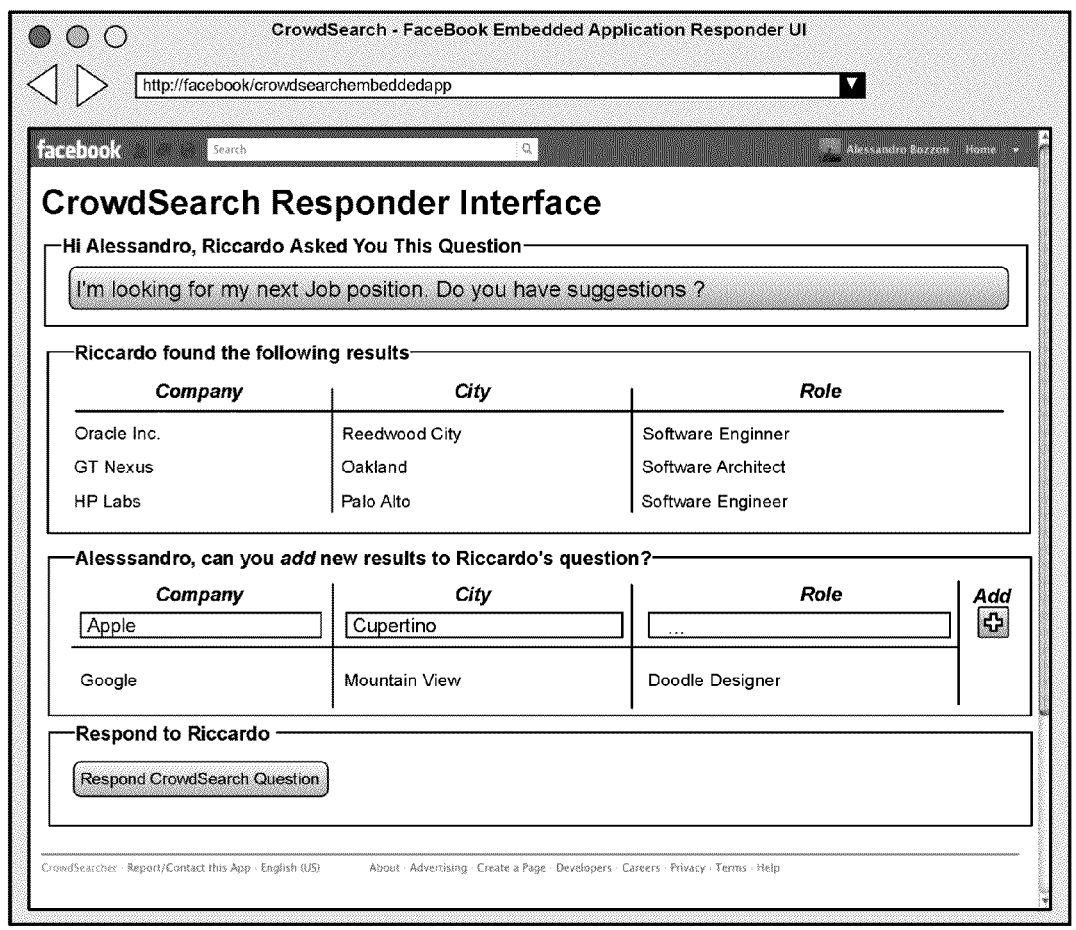
FIG. 7 is a sample screen display of a responder user interface of an application embedded into Facebook® for adding search objects.

FIG. 7 shows a sample screen display of a responder application UI rendering a platform-aware query template which is posted on the Facebook's wall of the crowd users, according to a system architecture as that of FIG. 4a, and friends are invited to add new job offers that they may be aware of (i.e. query operator "Insert Query"). The query is that described with reference to FIG. 5. This is a query with an embedded application which generates a new interface inside Facebook®.

Figure 8:
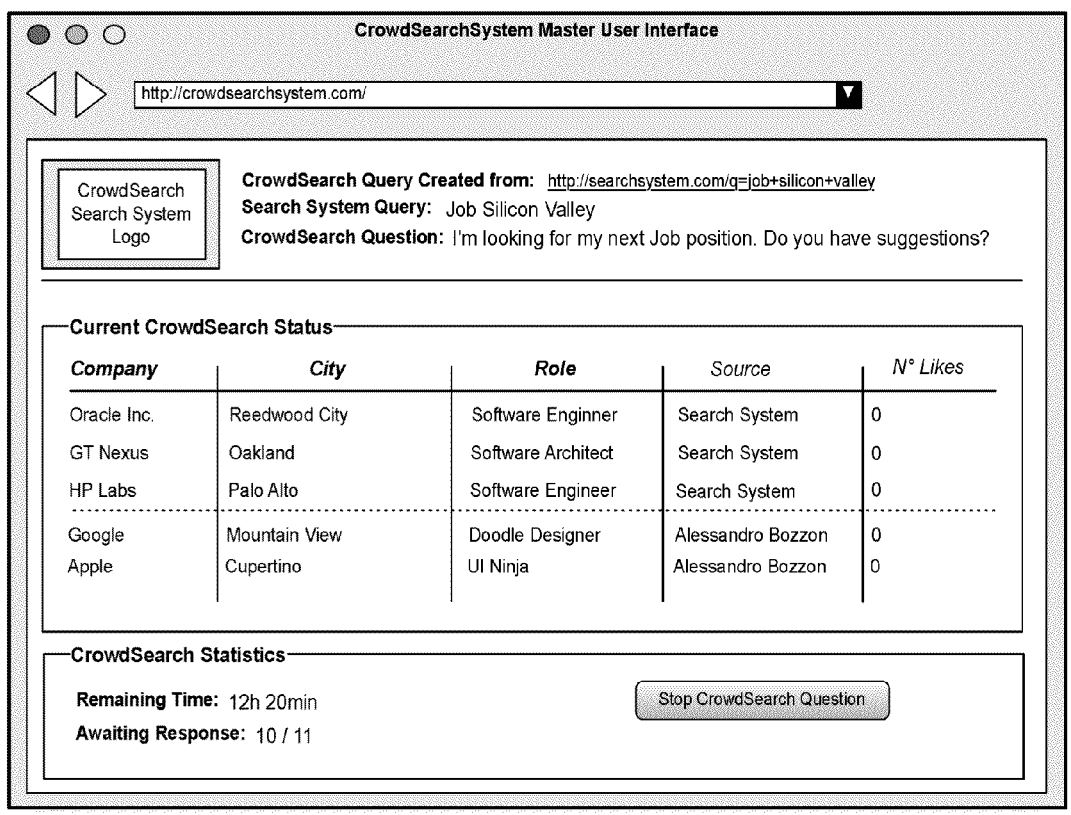
FIG. 8 is a sample screen display of a master user interface presented on the client side of the master user showing the rendering of a template for collecting the results of crowd search queries.

FIG. 8 shows a sample screen display of a master application UI rendering the result of the crowd search, where two new search objects representing jobs at Google® and Apple® are added to the previous three search objects. In an embodiment, the Master UI Generator module creates a dashboard screen rendered on the master user's client, which can be integrated within the exploratory search interface, summarizing the status of all the open questions and respective answers for a responder. In the example of FIG. 8, the master application UI is integrated with a search interface. When the crowd has responded to the query, the master user can inspect the query's result, which is compliant with the output model of the given query. The master user can access the results at any moment through his dashboard. This may improve the management of intrinsically asynchronous queries such as the crowd ones.

Figure 9:
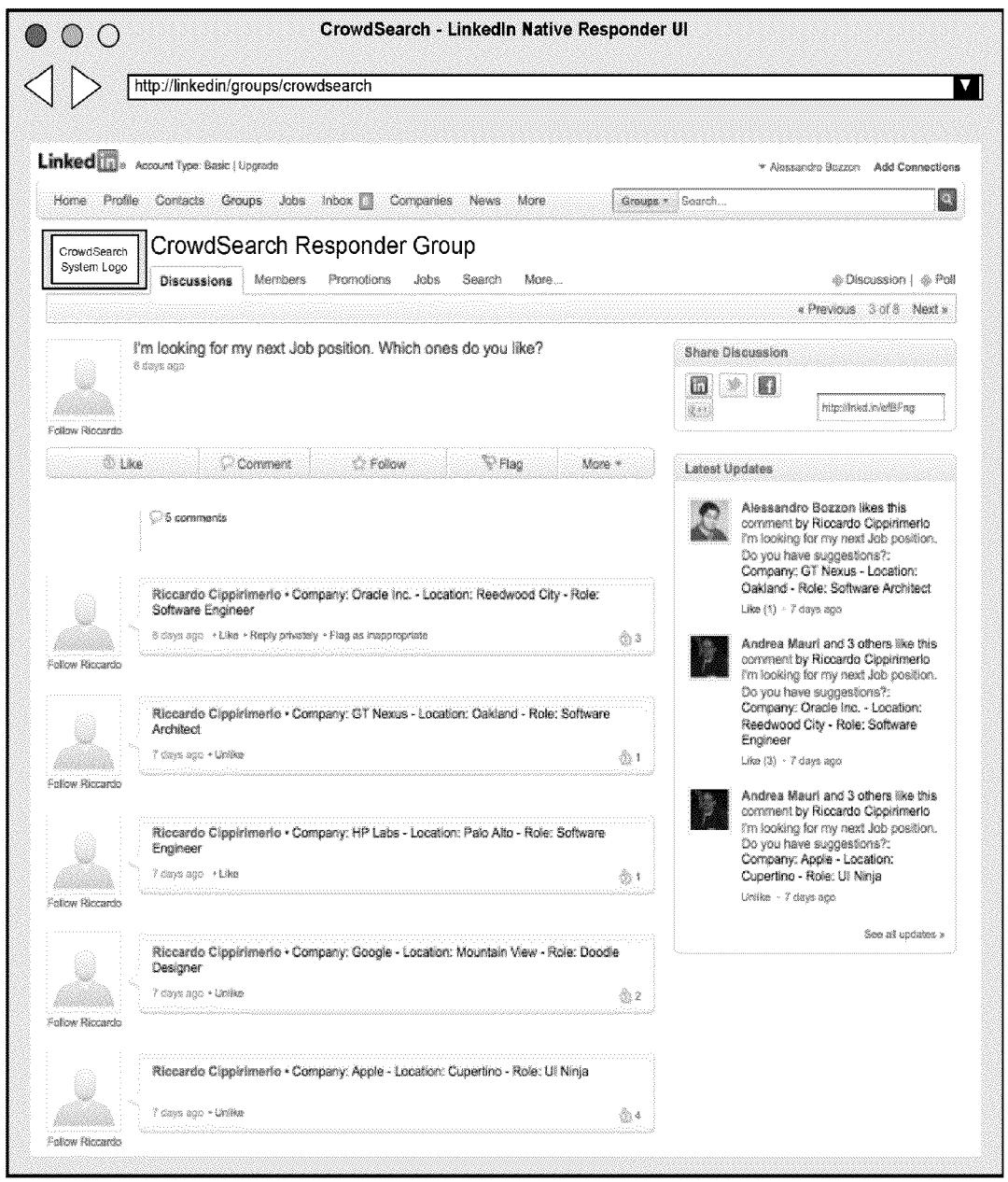
FIG. 9 is a sample screen display of a responder user interface of an application embedded into LinkedIn® for indicating preferences in the form of "like" relative to a collection of search objects.
Figure 10:
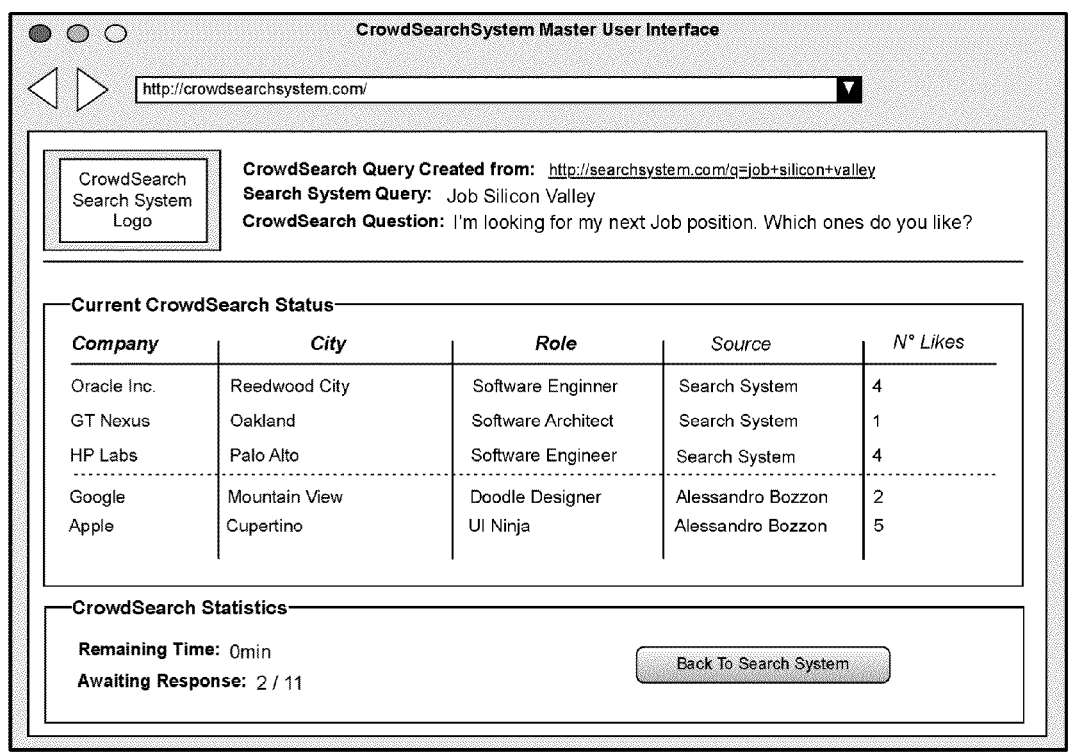
FIG. 10 is a sample screen display of a master user interface presented on the client side of the master user showing the rendering of a template for collecting the results of crowd search queries.

FIG. 9 shows a sample screen of a responder application UI where the master user has resubmitted her query, this time to LinkedIn® and to a community of information technology experts, asking them a suggestion on five search objects, three of them resulting from the search system and two of them resulting from the previous crowd search within Facebook® (FIG. 8). An intuitive, native support, as "like" query is a preference query operator supported in LinkedIn (in the usual way within the platform, the answer "no" to the like query is visualised as "unlike"). It is noted that, always within the architecture of importing the application UI in the native widgets of the social platform (i.e. FIG. 4a), other structured operators, such as comment, tag or score, can be described by work around solutions. For example a score can be built by counting the "like" answers. FIG. 10 shows a sample screen display of a master application UI rendering the result of the second crowd search described with reference to FIG. 9, where five search objects are described by the number of "likes" comments that have been produced by the crowd.

Figure 11:
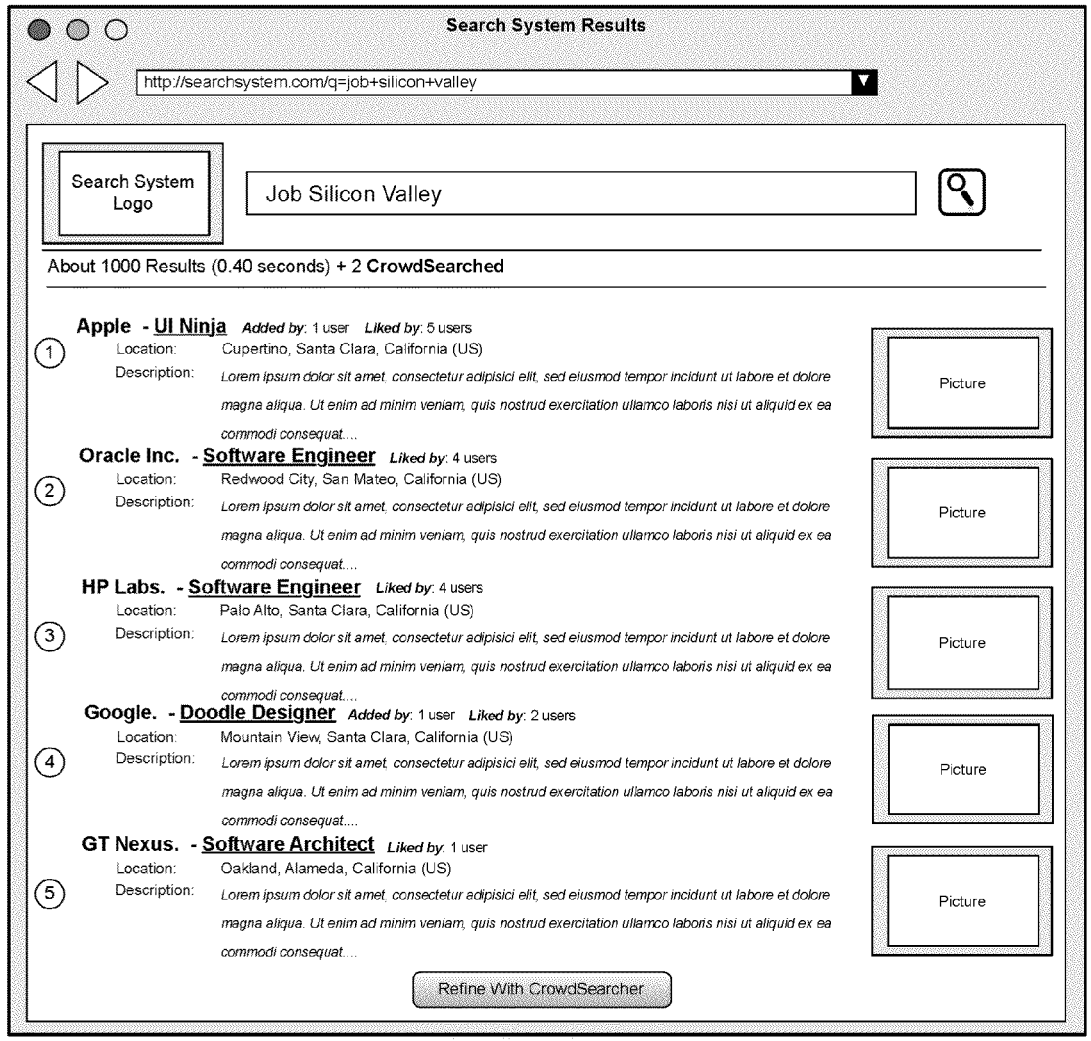
FIG. 11 is a sample screen display showing the results of an exemplary search query directed to a search system and the results of an exemplary crowd search query, where search objects are merged and ordered according to the preferences expressed by a crowd search query.

FIG. 11 shows an exemplary exploratory search interface integrating an output model created by the CSMS by collecting and processing the answers of the query of FIG. 8. In the present example, the output template is automatically exported back to an exploratory search interface. The jobs forming the query instances in the input model have been augmented with additional instances, and ordered according to the preferences expressed by the crowd. Such preferences in the form of "like" and "add" are added as annotations of each job. Optionally, the user can proceed from this state to further exploration steps and crowd questions.

The method and system of management of human-generated queries according to some embodiments of the present disclosure can exploit the power of human suggestions and insights for improving the quality of search results in complex, exploratory information seeking tasks. In some cases of interest, exploiting social platforms for crowd searching enables seamless access to broad sets of responders, at the cost of accepting a constrained interaction paradigm imposed by each platform—which are increasingly enhanced and more open. In accordance to some embodiments, the method and system of the present disclosure is able to define a comprehensive formalization of search that involves human sources.

The embodiments of the present invention have been disclosed above for illustrative purposes. Those skilled in the art will appreciate that various modifications, additions and substitutions are possible, without departing from the scope and spirit of the invention as disclosed in the accompanying claims.

The invention claimed is:

1. A computer-implemented method of management of queries for crowd searching in at least one social platform, the method comprising:
providing an input template to a master user for coding a query for crowd searching, the input template having an input format;
receiving input data in the input template according to the input format, the input data comprising a plurality of search objects, at least one structured query operator corresponding to social interactions and a human-generated question related to the plurality of search objects;
assembling the input data in the filled-in input template to generate a platform-independent input model constructing a query task for crowd searching, the input model being a tuple <C, N, S>, where C is a first data collection comprising the plurality of search objects, N is at least one natural language question related to the plurality of search objects, and S is at least one structured query operator relative to the first data collection C and defining what action should be performed in reply to the question;
processing the platform-independent input model according to a query task execution plan that defines the query task to be solved by a crowd by applying a mapping model to the platform-independent input model, wherein processing comprises selecting at least one social search engine running on a respective social platform, selecting one or more groups of responders interacting with the at least one social search engine and targeted to respond to the query task, and
instantiating, based on the query task execution plan, at least one platform-aware query template as the instance of the input model mapped to the at least one social platform, the at least one platform-aware query template having a data structure supported by the at least one social search engine;
importing the at least one platform-aware query template into the respective social platform through a responder application user interface allowing the one or more groups of responders to enter an answer to the query;
collecting the answers through interaction with responders of the one or more groups of responders through the at least one platform-aware template;
processing the collected answers so as to generate an output model instantiated by a platform-independent output template, wherein the output model is a tuple <C', S'> obtained by processing the input model according to the query task execution plan, with C' being a second data collection comprising a plurality of search objects and S' is at least one structured answer to the at least one query operator S, and
rendering the platform-independent output template as a query result to the master user.

2. The method of claim 1, wherein providing the input template to a master user is through a master application user interface and comprises prompting the master user to select at least one structured operator from a plurality of structured query operators available in the input template through the master application user interface.

3. The method of claim 1, wherein:
the input template comprises a layout of data fields for the incoming input data, and
receiving input data comprises:
inserting, by the master user, the human-generated question on a first data field of the input template,
selecting, by the master user, at least one structured query operator from a plurality of structured query operators comprised in the input template as entries of at least one second data field, and
importing the plurality of objects into the input template through a search interface of a search system.

4. The method of claim 1, wherein rendering the output template comprises exporting the output template to a search interface of a search system, the method further comprising, after rendering the output template, performing at least one of the following actions:
running a search process within the search system, the search process being at least partly based on the collected answers, and
repeating providing an input template to the master user and receiving input data, wherein the input data comprise at least part of the collected answers.

5. The method of claim 1, wherein:
processing the platform-independent input model comprises selecting a plurality of social search engines running on respective social platforms, selecting one or more groups of responders interacting with the plurality of social search engines and targeted to respond to the query task;
instantiating a plurality of platform-aware query templates having a respective data structure supported by a respective social search engine;
importing the plurality of platform-aware query templates into the plurality of social platforms through respective responder application user interfaces allowing the one or more groups of responders to enter an answer to the query, and
collecting answers comprises collecting by means of the plurality of platform-aware templates which are produced automatically as result of the query task execution plan.

6. The method of claim 1, wherein processing the collected answers comprises assembling the collected answers and rendering the output template to the master user comprises rendering the output template through a master application user interface by filling the output template with the collected answers.

7. The method of claim wherein the data collection C is one or more tuples described by a relational schema instance.

8. The method of claim 1, wherein processing the input model according to a query task execution plan is defined by a mapping model to be applied to the input model, the mapping model being a tuple comprising <E, G, D>, with E being the at least one social search engine, G being the one or more groups of responders interacting with the at least one social search engine and D the plurality of platform-aware query templates.

9. The method of claim 1, wherein the responder user interface is embedded in a embedding environment of the social platform by using a plug-in program logic in conjunction with the at least one social search engine.

10. The method of claim 9, wherein embedding comprises loading each responder application user interface of the plurality of responder application user interfaces on a client node of a responder of the one or more groups of responders.

11. The method of claim 1, wherein the at least one social search engine comprises at least one native widget running on a graphical user interface and the plurality of responder application user interfaces is rendered to the one or more groups of responders by using the at least one native widget of the social platform.

12. The method of claim 11, wherein the at least one social search engine comprises a plurality of application programming interfaces allowing access to the at least one native widget and to a database within the social platform for selecting the one or more groups of responders.

13. The method of claim 1, wherein importing the plurality of platform-aware query templates comprises rendering each platform-aware query template to a respective responder of the one or more groups of responders through a respective responder application user interface.

14. The method of claim 1, wherein the at least one preference query operator is at least one of the operators like query, dislike query, recommend query, and tag query.

15. The method of claim 1, wherein the at least one rank query operator is at least one of the operators order query and score query.

16. The method of claim 1, wherein the at least one cluster query operator is at least one of the operators group query, order group query, merge group query, and top group query.

17. The method of claim 1, wherein the at least one modification query operator is at least one of the operators insert query, delete query, correct query, and connect query.

18. The method of claim 1, wherein processing according to a query task execution plan further comprises setting a time threshold for the collection of answers.

19. A non-transitory computer-readable medium encoded with computer-executable instructions for performing the method of claim 1.

20. A method according to claim 1, wherein processing according to the query task execution plan further comprises splitting of the query task into a plurality of sub-query tasks and routing of sub-query tasks to sub-groups of responders of the one or more groups of responders.

21. The method of claim 1, wherein the step of receiving the input data comprises importing a plurality of search objects as results retrieved from a search system.

22. The method of claim 1, wherein the at least one structured query operator is one or more operators selected from the group consisting of at least one preference query operator, at least one rank query operator, at least one cluster query operator and at least one modification query operator.

* * * * *